United States Patent [19]

Rumberger

[11] Patent Number: 5,201,551
[45] Date of Patent: Apr. 13, 1993

[54] TWIST CANISTER FOR ROTATING JOINT
[75] Inventor: William E. Rumberger, Newton Square, Pa.
[73] Assignee: The Boeing Company, Seattle, Wash.
[21] Appl. No.: 736,202
[22] Filed: Jul. 26, 1991
[51] Int. Cl.⁵ .............................................. F16L 55/00
[52] U.S. Cl. ................................... 285/119; 285/272; 285/282; 244/49; 29/428
[58] Field of Search ........................ 285/119, 272, 282; 244/7 R, 7 A, 7 B, 7 C, 49; 29/428

[56] References Cited
U.S. PATENT DOCUMENTS

| | | | |
|---|---|---|---|
| 1,034,232 | 7/1922 | Hayes | 285/119 X |
| 1,441,157 | 1/1923 | Krenke | 285/272 X |
| 3,285,629 | 11/1966 | Cullen et al. | 285/119 |
| 4,280,720 | 7/1981 | Lomenech et al. | 285/272 X |
| 4,597,595 | 7/1986 | Wallace | 285/119 |
| 4,643,462 | 2/1987 | Wallace | 285/119 |
| 4,742,792 | 5/1988 | Mank | 285/119 X |
| 4,915,416 | 4/1990 | Barrett | 285/119 X |

FOREIGN PATENT DOCUMENTS 2223074 3/1990 United Kingdom ................ 285/272

Primary Examiner—Dave W. Arola
Attorney, Agent, or Firm—Jones, Tullar & Cooper

[57] ABSTRACT

A twist canister for conducting conduits between two members rotatable with respect to each other through a predetermined angle about an axis. The conduits are pre-flexed an angular amount equal to one half of the predetermined angle when the members are at the extreme of the rotational angle with respect to each other. The conduits are flexed only one half of the predetermined angle during rotation of the members through the total predetermined angle. The conduits are placed generally in a plane parallel to the axis to minimize the space required for the canister.

15 Claims, 4 Drawing Sheets

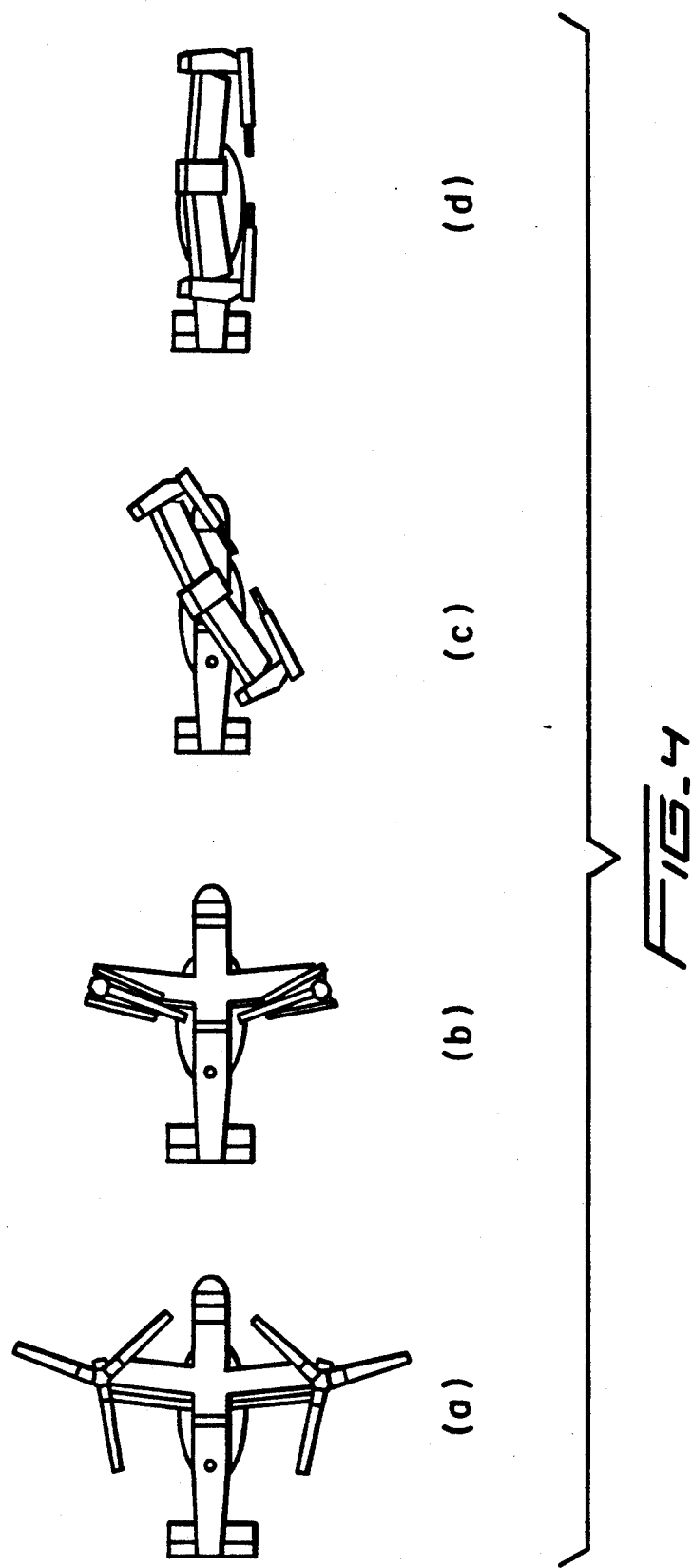

TWIST CANISTER FOR ROTATING JOINT

BACKGROUND OF THE INVENTION

This invention relates generally to twist canisters and in particular to a twist canister which provides a means for conducting electrical and fluid conduits across a pivoting joint using a minimum of space minimum length of conduit and requiring a minimum amount of energy to accomplish the required pivotal movement.

Many devices for conducting electrical signals and fluid conduits across pivotal joints are known in the art. One such method utilizes sliding contacts such as slip rings for electrical signals and similar rotatable joints for fluid conduits. These mechanisms must be used when unlimited rotation is required. However, they create many problems such as leakage in fluid lines, electrical noise on signal lines and high electrical current transmission. Where only limited rotation is required, a twist capsule is the preferred solution.

Twist capsules of the prior art often require relatively large amounts of power to accomplish the required rotation since they usually require bending, folding and sliding of the conduits. When bending and/or folding is required to accommodate the rotation, relatively long conduits are required. In addition, bending, folding and sliding conductors results in substantial wear which increases the chance of failure of the conduit. In certain critical applications, such as in sophisticated aircraft structures, such a failure can be catastrophic.

The present invention overcomes these problems by first, minimizing the bending or flexing of the conduits, secondly, the conduits are pre-flexed in order to minimize conduit motion and the conduits are pre-flexed half of the total rotation required such that the conduits are in an unflexed condition at a point half way in the rotation. In addition, the flexure required takes place as translation in a vertical plane rather than horizontal which minimizes the space required for the total assembly. Where the conduit does not accept sufficient torsional motion, swivel fittings may be used. This combination of features insures long life for the conduits and minimum power for actuation.

SUMMARY AND OBJECT OF THE INVENTION

According to the instant invention, the electrical and fluid conduits are positioned in their neutral position at a point halfway between the extremes of required rotation. Thus, when the rotation is at either extreme, the flexure or torsional twist of the conduits is only half of the total required rotation. In addition, since the conduits are in the neutral position at the halfway point, the energy and conduit distortion required to complete the rotation is reduced. From the first extreme position to the neutral position the energy stored in the conduits by pre-flexing is given up to the power source. During the second half of rotation, only the initial pre-flexing energy is required to complete the rotation cycle. The conduits enter the capsule from a horizontal position relative to the axis of rotation of the capsule, rise vertically through the capsule and attach to the other member in a vertical or horizontal attitude as required. Thus most of the flexing of the conduits is in a torsional motion. This means of flexure allow conduits of shorter length to be used when compared to canisters using folding motion to accommodate the rotation. These shorter conduits result in a substantial saving in weight and space compared to other canisters. This is particularly valuable in aircraft applications where weight and space are critical.

It is therefor an object of the invention to provide a twist canister which requires a minimum amount of power for actuation.

It is another object of the invention to provide a twist canister requiring a minimum of actuating space.

It is yet another object of the invention to provide a twist canister in which the conduits are subject to little flexure during rotation.

It is another object of the invention to provide a method of conducting electrical and fluid conduits across a rotating joint using the least energy and space while preserving the integrity of the conduits.

It is another object of the invention to provide a twist canister which utilizes short conduits.

These and other objects of the invention will become apparent from the following detailed description in which reference numerals used throughout the description correspond to reference numerals appearing on the drawing figures.

BRIEF DESCRIPTION OF THE DRAWINGS

FIG. 4a–4d are multi position views of an application of the twist capsule to a rotating wing of an aircraft.

DESCRIPTION OF THE PREFERRED EMBODIMENT

Figure 1:
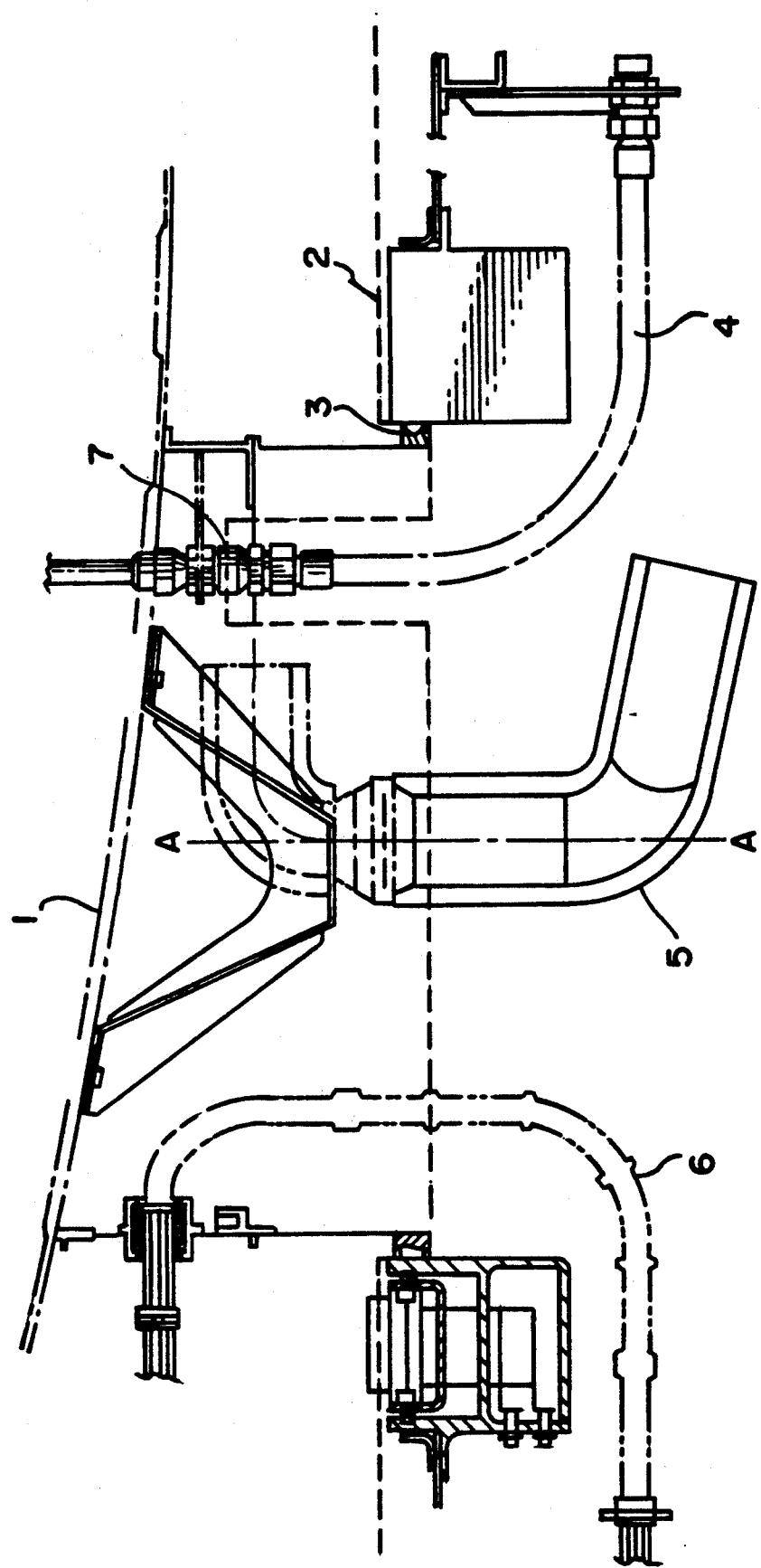
FIG. 1 is a cross sectional view through the twist capsule.

Referring now to the drawings, FIG. 4 illustrates an application of the twist capsule of this invention. This figure shows a tilt rotor aircraft which is required to fold the propellers and rotate the wing 90 degrees to minimize storage space and to allow the aircraft to be handled in the elevators of an aircraft carrier. As can be seen, since the engines, rotor controls and engine tilt mechanism are all on the wing, it is necessary to provide a means to rotate the conduits for electrical, hydraulic and pneumatic conductors to the wing structure when the wing is positioned for storage.

In the FIG. 4. at (a), the aircraft is shown in its vertical flight position. To accomplish the wing stow action the rotor blades are folded as shown at (b). Next, as shown in (c) and (d), the rotation of the wing is completed to place the span of the wing along the fore and aft axis of the aircraft.

Referring now to FIG. 1, there is shown a cross section of the twist canister mounted in the aircraft of FIG. 4. The wing 1 is shown at the top of the drawing and is rotatable about Axis A—A from the flight position to the stow position relative to the under deck or fixed portion of the aircraft shown generally at 2 and is guided during rotation by pressure seal 3. The conduits passing through the joint are represented as hydraulic lines 4, pneumatic lines 5 which pass through the center line of rotation using a swivel connector, and electrical wire bundles shown at 6. One end of each of the conduits is fastened to the under deck in a horizontal plane and the other end to the wing structure. From the horizontal deck fastening, the conduits rise vertically through the capsule and are attached in a vertical or horizontal manner as required to the wing. Three sets of conduits are shown which substantially identical for illustration purposes.

Figure 2:
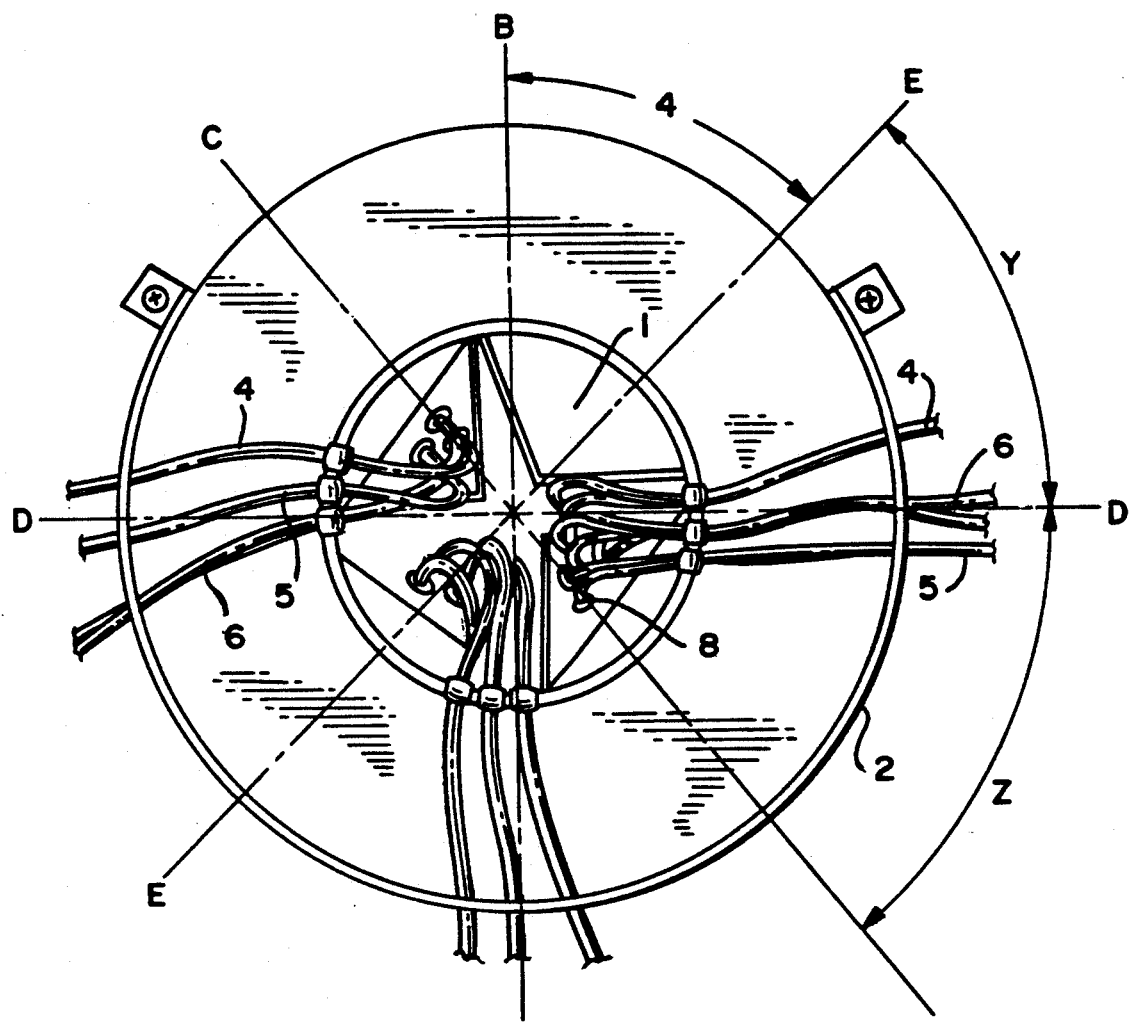
FIG. 2 is a plan view of the twist capsule in one extreme position of rotation.
Figure 3:
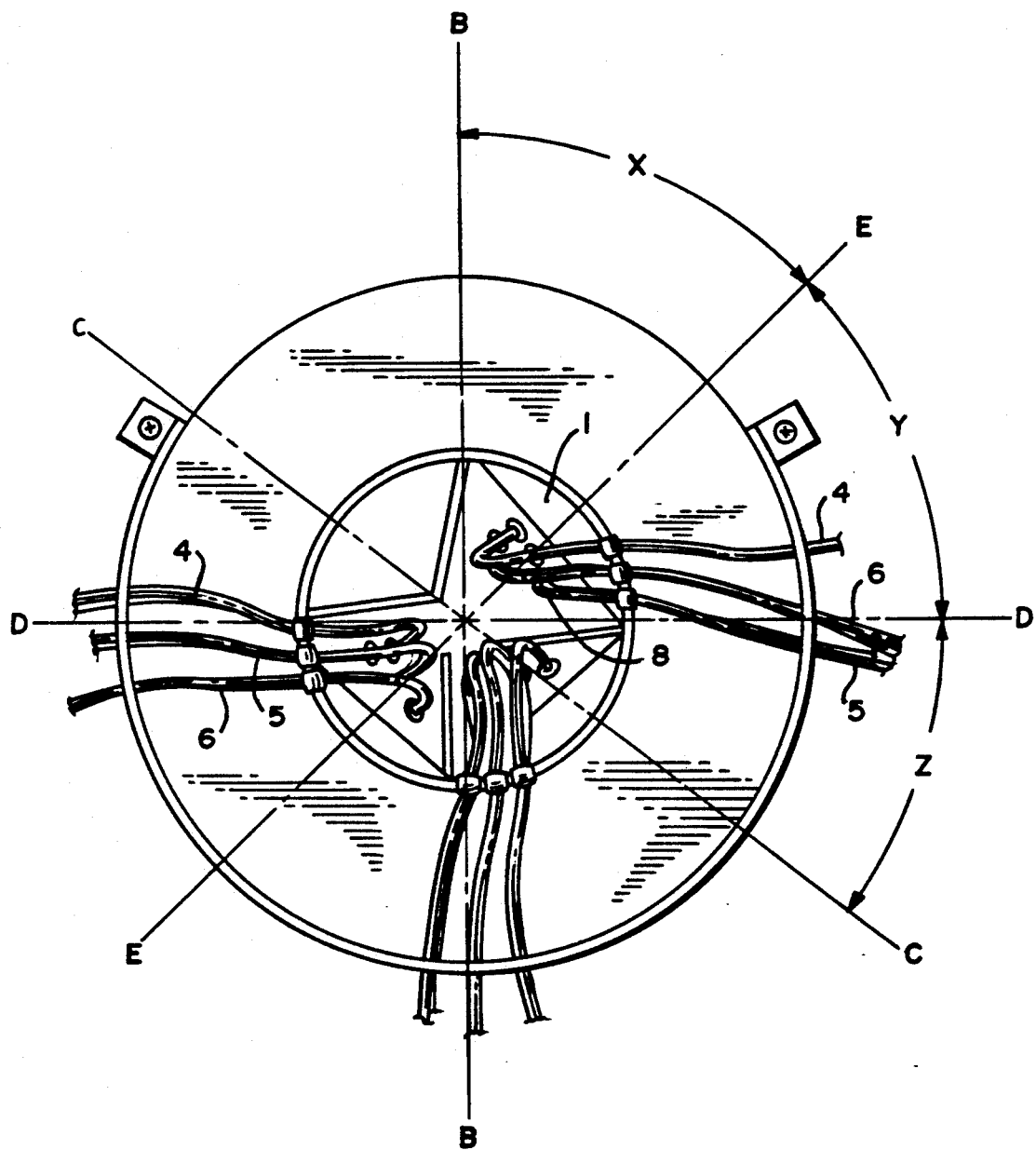
FIG. 3 is a second plan view of the twist capsule in the other extreme position of rotation.

Referring now to FIG. 2 and FIG. 3, FIG. 2 shows the wing in the flight position and FIG. 3 shows it in the stow position relative to the deck 2. In order to describe the action of the twist capsule, a reference point will be taken at connector 8 where conduit 5 attaches vertically to the wing structure. Thus, in FIG. 2, when connector 8 lies on radial line C—C, the wing is in the flight position shown at (a) in FIG. 4. As the wing is moved toward the stow position of (d) in FIG. 4, connector 8 moves through angles Z and Y to arrive at the stow as shown in FIG. 3. When connector 8 lies on radial line D—D, lying half way between the flight and stowed positions, the conduits are in the neutral position of flexure. As the wing moves to the stowed position of FIG. 3, the conduits assume the same amount of flexure as in FIG. 2 but in the opposite direction. As can be seen, the flexure of the conduits is nearly pure torsional motion about a vertical axis. Bending or curling of the conduits is minimal. The wire bundles 6 and the pneumatic conduits 5 are traditionally soft in torsion and are not unduly stressed by the wing rotation. Hydraulic conduits are traditionally stiff in torsion. Thus, if such torsionally stiff hydraulic conduits are used, a swivel fitting as shown at 7 in FIG. 1 may be used. However, when using the twist capsule of the invention it is desirable to depart from the traditional stiff conduit and use a torsionally soft tubing and eliminate the swivel fitting. This is possible in practicing the invention because the length of conduit required is short due to the pre-flexing of the conduits.

What is claimed is:

1. A twist canister for connecting a conduit between structural members, said canister comprising:
   a first member;
   a second member positioned adjacent said first member and rotatable with respect to said first member about an axis common to both members through a predetermined angle;
   means for connecting one end of said conduit to said first member; and
   means for connecting the other end of said conduit to said second member after said conduit has been flexed about the rotational axis an angular amount equal to one half of said predetermined angle when said first and second members are at the extreme of the predetermined angle with respect to each other about the rotational axis.

2. A twist canister according to claim 1, wherein said conduit is attached to the first and second members in a plane orthogonal to the rotational axis.

3. A twist canister according to claim 1, wherein one end of said conduit is attached to said first member in a plane orthogonal to the rotational axis and the other end of said conduit is attached to the second member in a plane parallel to the rotational axis.

4. A twist canister according to claim 3 and further comprising a swivel connector connecting one end of the conduit to said second member.

5. A twist canister according to claim 1 and further comprising a plurality of conduits, for conducting electrical signals and fluids between said first and second members.

6. A twist canister according to claim 5, wherein said conduits conducting electrical signals are attached to said first and second members in a plane orthogonal to said rotational axis and said conduits conducting fluids are attached to said first member in a plane orthogonal to said rotational axis and to said second member in a plane parallel to said rotational axis.

7. A twist canister according to claim 6, wherein the conduits conducting fluids are attached to said second member by means of a swivel connector.

8. A method of attaching a conduit between first and second members, said members being rotatable with respect to each other about a common axis through a predetermined angle, said method comprising the steps of:
   rotating said first and second members with respect to each other about the common axis through said predetermined angle;
   attaching one end of said conduit to said first member;
   flexing said conduit so that the other end of said conduit rotates about the axis through an angle approximately equal to one half of the predetermined angle; and
   attaching the other end of said conduit to said second member.

9. The method according to claim 8, wherein the ends of the conduit are attached in a plane orthogonal to the axis.

10. The method according to claim 9, wherein one end of the conduit is attached to the second member in a plane parallel to the axis.

11. The method according to claim 10 comprising the further step of attaching a swivel connector between the end of the conduit and the second member.

12. The method according to claim 8, wherein a plurality of conduits are connected between the first and second members, some of said conduits conducting fluids and some of said conduits conducting electrical signals.

13. The method according to claim 12, wherein said conduits conducting electrical signals are attached to said first and second members in a plane orthogonal to the axis.

14. The method according to claim 13, wherein the conduits conducting fluids are attached to the second member in a plane parallel to the axis.

15. The method according to claim 14 further comprising the step of connecting a swivel connector between one end of the conduit and the second member.

* * * * *